US012461387B2

(12) United States Patent
Tucker (10) Patent No.: US 12,461,387 B2
(45) Date of Patent: Nov. 4, 2025

(54) OPHTHALMIC LENSES WITH COSMETIC FILM THEREIN

(71) Applicant: Alcon Inc., Fribourg (CH)

(72) Inventor: Robert Carey Tucker, Johns Creek, GA (US)

(73) Assignee: Alcon Inc., Fribourg (CH)

( * ) Notice: Subject to any disclaimer, the term of this patent is extended or adjusted under 35 U.S.C. 154(b) by 656 days.

(21) Appl. No.: 17/654,079

(22) Filed: Mar. 9, 2022

(65) Prior Publication Data

US 2022/0291525 A1 Sep. 15, 2022

Related U.S. Application Data

(60) Provisional application No. 63/159,861, filed on Mar. 11, 2021.

(51) Int. Cl.
*G02C 7/04* (2006.01)
*B29D 11/00* (2006.01)
*G02C 7/02* (2006.01)

(52) U.S. Cl.
CPC ........ *G02C 7/049* (2013.01); *B29D 11/00134* (2013.01); *B29D 11/00192* (2013.01); *G02C 7/024* (2013.01)

(58) Field of Classification Search
CPC ........ G02C 7/049; G02C 7/024; G02C 7/021; G02C 7/046; B29D 11/00134; B29D 11/00192; B29D 11/00048; B29D 11/00317; B29D 11/00894
See application file for complete search history.

(56) References Cited

U.S. PATENT DOCUMENTS

| 4,121,896 | A | 10/1978 | Shepherd |
| 4,444,711 | A | 4/1984 | Schad |

(Continued)

FOREIGN PATENT DOCUMENTS

| EP | 0367513 A2 | 5/1990 |
| JP | 2013250350 A * | 12/2013 |

(Continued)

OTHER PUBLICATIONS

Gelest, "Reactive silicones: forging new polymer links", v 6, pp. 55-57.

(Continued)

*Primary Examiner* — Bumsuk Won
*Assistant Examiner* — John Curtis Sipes
(74) *Attorney, Agent, or Firm* — Sheng-Hsin Hu (57) ABSTRACT

Described herein is a colored hydrogel contact lens, comprising:
a hydrogel material; at least one cosmetic colored film; wherein the cosmetic colored film is made of a thermal plastic material or thermal setting material and is surrounded by the hydrogel material, wherein the colored hydrogel contact lens is capable of absorbing from about 10% to about 75% by weight of water when being fully hydrated, wherein the contact lens has an anterior surface and an opposite posterior surface and a circumferential edge where the anterior and posterior surfaces are tapered off, wherein the contact lens comprises a central optical zone, a peripheral zone surrounding the central optical zone, and an edge zone surrounding the peripheral zone.

9 Claims, 4 Drawing Sheets

(56) References Cited

U.S. PATENT DOCUMENTS

| | | | |
|---|---|---|---|
| 4,447,474 A * | 5/1984 | Neefe | B05D 7/04 |
| | | | 427/164 |
| 4,460,534 A | 7/1984 | Boehm et al. | |
| 4,719,657 A | 1/1988 | Bawa | |
| 5,034,166 A | 7/1991 | Rawlings et al. | |
| 5,116,112 A | 5/1992 | Rawlings | |
| 5,120,121 A * | 6/1992 | Rawlings | B29D 11/00894 |
| | | | 351/159.41 |
| 5,508,317 A | 4/1996 | Muller | |
| 5,583,163 A | 12/1996 | Muller | |
| 5,789,464 A | 8/1998 | Muller | |
| 5,843,346 A | 12/1998 | Morrill | |
| 5,849,810 A | 12/1998 | Muller | |
| 5,894,002 A | 4/1999 | Boneberger et al. | |
| 5,969,076 A | 10/1999 | Lai et al. | |
| 6,086,204 A | 7/2000 | Magnante | |
| 6,416,690 B1 | 7/2002 | Soane et al. | |
| 6,627,124 B1 | 9/2003 | Herbrechtsmeier et al. | |
| 6,800,225 B1 | 10/2004 | Hagmann et al. | |
| 7,384,590 B2 | 6/2008 | Kelly et al. | |
| 8,163,206 B2 | 4/2012 | Chang et al. | |
| 9,307,654 B2 * | 4/2016 | Riall | B29D 11/00807 |
| 2005/0185134 A1 | 8/2005 | Ocampo | |
| 2006/0065138 A1 * | 3/2006 | Tucker | C09D 11/101 |
| | | | 101/41 |
| 2012/0120365 A1 | 5/2012 | Legerton | |
| 2017/0242275 A1 * | 8/2017 | Chang | B29D 11/00134 |
| 2017/0307779 A1 | 10/2017 | Marullo et al. | |
| 2018/0017712 A1 | 1/2018 | Richardson et al. | |
| 2018/0173008 A1 * | 6/2018 | Flitsch | G02C 7/101 |
| 2020/0387009 A1 * | 12/2020 | Saha | B29D 11/00076 |
| 2021/0263336 A1 * | 8/2021 | Gupta | G02C 7/049 |

FOREIGN PATENT DOCUMENTS

| | | | |
|---|---|---|---|
| JP | 3215253 U | | 3/2018 |
| JP | 2019040169 A | * | 3/2019 |
| TW | 202014763 A | | 4/2020 |
| WO | 8704390 A1 | | 7/1987 |
| WO | 2018085983 A1 | | 5/2018 |
| WO | 2020240440 A1 | | 12/2020 |

OTHER PUBLICATIONS

Efron Nathan: "Tinted Lenses", Contact Lens Practice E-Book, Jan. 24, 2017 (Jan. 24, 2017), pp. 204-213 .e2.

Efron Nathan: "Soft Lens Manufacture", Contact Lens Practice E-Book, Jan. 24, 2017 (Jan. 24, 2017), pp. 61-67.e1.

Carole Maldonado-Codna: "Soft Lens Materials", Contact Lens Practice E-Book, Jan. 24, 2017 (Jan. 24, 2017), pp. 45-60.e1.

Young Graeme: "Soft Lens Design and Fitting", Contact Lens Practice E-Book, Jan. 24, 2017 (Jan. 24, 2017), pp. 86-94.e1.

* cited by examiner

OPHTHALMIC LENSES WITH COSMETIC FILM THEREIN

This invention is related to an ophthalmic lens, in particular, a contact lens, which comprises a cosmetic film therein.

BACKGROUND

For cosmetic purposes, contact lenses having one or more colored cosmetic pattern on the lens are in high demand. These colored contact lenses enhance the natural beauty of the eye, or provide unique patterns on the iris of the wearer.

Current colored contact lenses require the colored layer to be applied to either the lens or the mold through a printing step. The first method involves ink transfer printing directly on contact lenses. The second method of printing inks onto contact lens involves the colored film to be transferred to the lens is first deposited on a surface of the mold wherein the lens is subsequently formed. For both methods, the pattern of the liquid colored film can be provided by etching or lasering a metal or ceramic plate. The etched pattern is then filled with an appropriate ink, leveled out with a suitable doctoring device, and a soft silicone rubber transfer stamp or pad impressed thereupon to transfer the pattern on the pad's surface. For the first method, the pad containing the image is then brought to the contact lens. For the second method, the pad containing the image brought to the lens forming mold and depressed in the correct place to transfer the pattern thus creating the colored film. The colored film may then be subjected to a partial or full cure. Thereafter, lens forming material is added to the mold and actinically or thermally cured to form the contact lens whereby the colored film detaches from the molding surface and becomes integral with the body of the contact lens. The silicone pads are made of a material comprising silicon that can vary in elasticity. The properties of the silicone material permit the inks to stick to the pad temporarily and fully release from the pad when it contacts the contact lens.

There are several disadvantages associated with using cliche ink transfer printing to color contact lenses. This method lacks consistency. Slight differences in the silicone pad can cause wide variation in image quality, effecting dot resolution and color reproducibility. Further, multiple color layering is difficult and time consuming. Further still, the design and printing process using this method is slow. After an image is fully designed, it can take about two weeks before that image is etched onto a cliche. The set-up is painstakingly detailed and lengthy when more than one color is going to be printed on the lens using this method. The difficulty and slowness of this printing method inhibits business strategies, making it difficult to offer an expanding palette of color choices or consumers a chance to design and print their own contact lenses at the point of purchase.

Often, this printing step (such as pad printing) is a rate-limiting step, often slowing down production. The ink has many requirements to resist the high shear conditions that are induced during formulation dosing and closing. The inks must be deposited and carefully crosslinked to minimize smearing caused by this shearing. Because of this requirement, the ink formulations are often formulated with toxic monomers and crosslinkers. The residual ink monomers may require additional extraction steps to ensure the toxicity is low.

Therefore, there is still a need for a cosmetic contact lens which would not rely on applying colored layer to either the lens or the mold through a printing step. A proposed solution to this problem described in this patent is to enable the contact lens to be made high speed.

SUMMARY

The present invention, in one aspect, is generally directed a colored hydrogel contact lens, comprising:
a hydrogel material; and at least one cosmetic colored film;
wherein the cosmetic colored film is made of a thermal plastic material or thermal setting material and is surrounded by the hydrogel material,
wherein the colored hydrogel contact lens is capable of absorbing from about 10% to about 75% by weight of water when being fully hydrated,
wherein the contact lens has an anterior surface and an opposite posterior surface and a circumferential edge where the anterior and posterior surfaces are tapered off,
wherein the contact lens comprises a central optical zone, a peripheral zone surrounding the central optical zone, and an edge zone surrounding the peripheral zone.

The present invention, in another aspect, provides a method for producing colored hydrogel contact lenses each having at least one cosmetic colored film embedded therein, comprising the steps of:
(1) obtaining a polymerizable composition for forming a hydrogel material,
(2) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
(3) obtaining a cosmetic colored film, wherein the cosmetic colored film is made of a thermal plastic material or thermal setting material;
(4) placing the cosmetic colored film at a specified position in the lens mold and introducing the polymerizable composition in the lens mold, wherein the cosmetic colored film is immersed in the polymerizable composition in the lens mold;
(5) curing the polymerizable composition in the lens mold to form a cosmetic hydrogel contact lens having the cosmetic colored film surrounded by the hydrogel material;
(6) separating the lens mold obtained in step (5) into the male and female mold halves, with the cosmetic hydrogel contact lens adhered on a lens-adhered mold half which is one of the male and female mold halves;
(7) removing the cosmetic hydrogel contact lens from the lens-adhered mold half; and
(8) subjecting the cosmetic hydrogel contact lens to post-molding processes including a hydration process and one or more other processes selected from the group consisting of extraction, surface treatment, packaging, sterilization, and combinations thereof.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings.

As used in this application, the term "contact lens" refers to a structure that can be placed on or within a wearer's eye, as known to a person skilled in the art. A contact lens can correct, improve, or alter a user's eyesight, but that need not be the case. A contact lens can be of any appropriate material known in the art or later developed, and can be a soft lens, a hard lens, or a hybrid lens. Soft contact lenses are hydrogel contact lens or silicone hydrogel contact lenses.

A "hydrogel contact lens" refers to a contact lens having a lens body made of a hydrogel material. A "silicone hydrogel contact lens" refers to a contact lens having a lens body made of a silicone hydrogel material.

As used in this application, the term "hydrogel" or "hydrogel material" refers to a crosslinked polymeric material which is not water-soluble and contains at least 10% by weight of water within its polymer matrix when fully hydrated, as known to a person skilled in the art.

As used in this application, the term "non-silicone hydrogel material" refers to a hydrogel material that is theoretically free of silicon, as known to a person skilled in the art.

As used in this application, the term "silicone hydrogel" refers to a hydrogel material containing silicone, as known to a person skilled in the art.

Typically, a contact lens has an anterior surface (or front surface or front curve-FC) and an opposite posterior surface (or back surface or base curve-BC) and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

Each of the anterior and posterior surfaces of a contact lens typically comprises a central optical zone, a peripheral zone (i.e., one or more non-optical zones) surrounding the central optical zone, as well known to a person skilled in the art. Correspondingly, a contact lens comprises a central optical zone and a peripheral zone (i.e., one or more non-optical zones) surrounding the central optical zone, by the combination of the anterior and posterior surfaces.

The present invention, in one aspect, is generally directed a colored hydrogel contact lens, comprising:
a hydrogel material; at least one cosmetic colored film;
wherein the cosmetic colored film is made of a thermal plastic material or thermal setting material and is surrounded by the hydrogel material,
wherein the colored hydrogel contact lens is capable of absorbing from about 10% to about 75% by weight of water when being fully hydrated.

The present invention is partly based on the discovery that a colored lens can be made more efficiently and economically by preparing a cosmetic colored film ahead of time. Previous printing on contact lenses were done either on the mold or on the contact lens. Unfortunately, printing on curved surfaces limits the type of printing techniques that can be used (i.e. only pad printing or possibly ink jet). The present method allows the printing step to be done as a separate manufacturing step, with opportunity to print larger number of cosmetic colored films more efficiently than current printing processes. Printing can be optimized on a flat surface, including ink drop off and curing. Printing on a flat cosmetic colored film material relieves much of the printing ink constraints. Printing and ink curing can be completed on a separate manufacturing sequence, eliminating this often rate-limiting step. The toxicity of the printing ink can be eliminated by curing or washing the printed insert prior to placing in the DSM mold.

The cosmetic colored film would be made of a thermoplastic or thermoformable sheet, onto which colored lens patterns could be printed using a wide variety of printing techniques. After printing, the cosmetic colored film material could then be inserted into a contact lens mold. Standard contact lens formulation would be poured around the cosmetic colored film material, sandwiching the cosmetic colored film inside the contact lens. In one case, cosmetic colored film material could be compatible with the contact lens formulation, causing polymer interpenetration into the cosmetic colored film by forming a porous cosmetic colored film material. Alternatively, the cosmetic colored film material could contact one of the contact lens surfaces (i.e. BC or FC surface). Alternatively, the cosmetic colored film could dissolve within the contact lens formulation solvent, leaving only the cured ink remaining within the contact lens. The contact lens material would form around the printed layer, providing a uniform clear coat layer. The cosmetic colored film could form a clear coating, sandwiching the print between the cosmetic colored film and the cured contact lens material.

Such thermoplastic materials as acrylic, PVP, PLA, PGA, or copolymers thereof, could be used. PVP might be a good starting candidate, since this material has a chance of good material compatibility (i.e. good chain interpenetration) with the lens formulation. Alternately, the thermoplastic could be composed of solid silicone material, which could be cured into the contact lens formulation.

Alternately, the cosmetic colored film could be thermoplastic initially, which becomes crosslinked after heat treatment during thermoforming, or reacted with the contact lens formulation. For example, polysilsequioxane resins soften at above 40 C, but can undergo condensation reactions to become a solid film (Gelest, Reactive silicones: forging new polymer links, v 6, p. 55, 57. Some silsesquioxanes can form films when exposed to UV lights.

Alternately, the cosmetic colored film could be thermoset, where the cosmetic colored film is a thermosetting polymer or resin. After printing, and during thermoforming, the cosmetic colored film becomes insoluble after heat or radiation. Essentially, after printing, the thermoset resin is compression molded into the hemispherical shape.

After thermoforming/thermosetting, the cosmetic colored film can be mechanically cut or shaped to form a lens, removing any edge defect or flash. The modified cosmetic colored film can still be inserted into the DSM mold, and the contact lens formulation shaped around it. The thermoforming/thermosetting step can also be used to apply a small lip on the cosmetic colored film, which would allow for proper placement within the DSM mold (i.e. the insert would be centered between the lens formulation).

Multiple cosmetic colored films can be printed on a large sheet, possibly using alternate printing techniques to pad printing (i.e. dye sublimation, rotary presses, offset presses, gravure, flexography). In addition, the sheets of printed inserts can be washed in a solvent (aqueous or organic) prior to thermoforming to eliminate any residual monomers that would impact the final lens toxicity. In any regard, the multiple inserts can be punched directly into the mold immediately before dosing and curing. The final lens could be used with or without an in package coating, to ensure the surface is wettable and lubricious.

According to the present application, the thickness of the cosmetic film is at least 5 micron and less than 80 micron, preferably more than 10 micron and less than 60 micron, still more preferably more than 20 micron and less than 50 micron.

Figure 1:
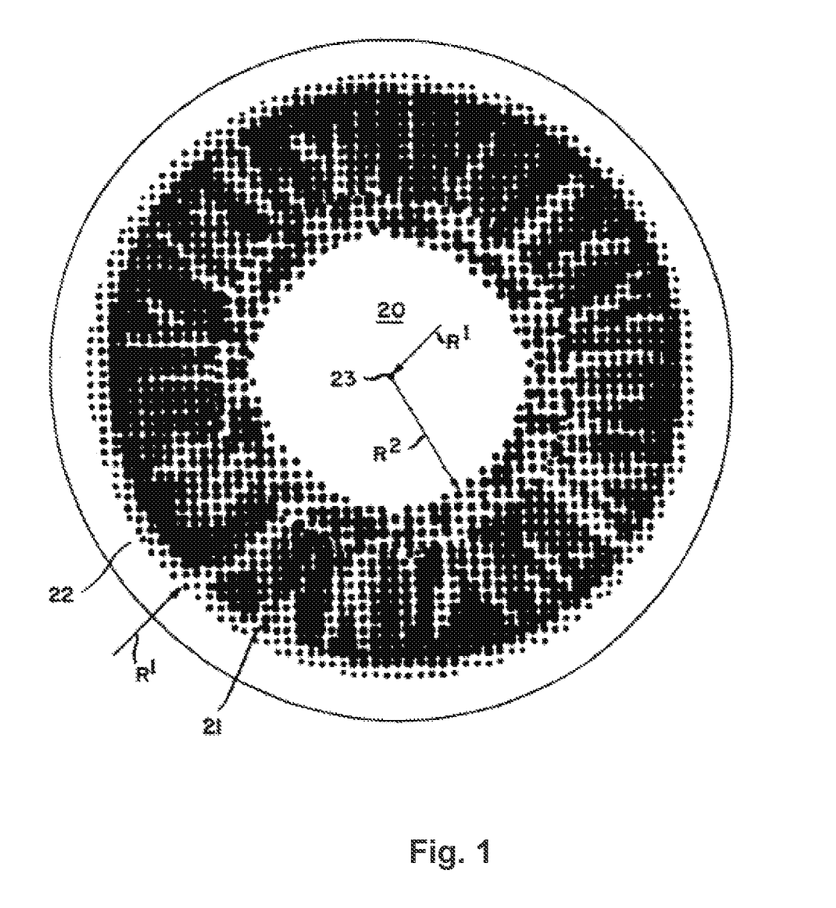
FIG. 1 as an example illustrates a prior art cosmetic contact lens.

FIG. 1 as an example illustrates a prior art contact lens. It has a non-opaque pupil section 20 in the center of lens, and an annular iris section 21 surrounding the pupil section. For hydrophilic lenses, a transparent peripheral section 22 surrounds iris section 21. A colored, intermittent pattern is located over the entire iris section 21, as show in FIG. 1. The pattern leaves a substantial portion of the iris section within the interstices of the pattern non-opaque. The non-coated areas of iris section 22 appear white in FIG. 1.

Figure 2:
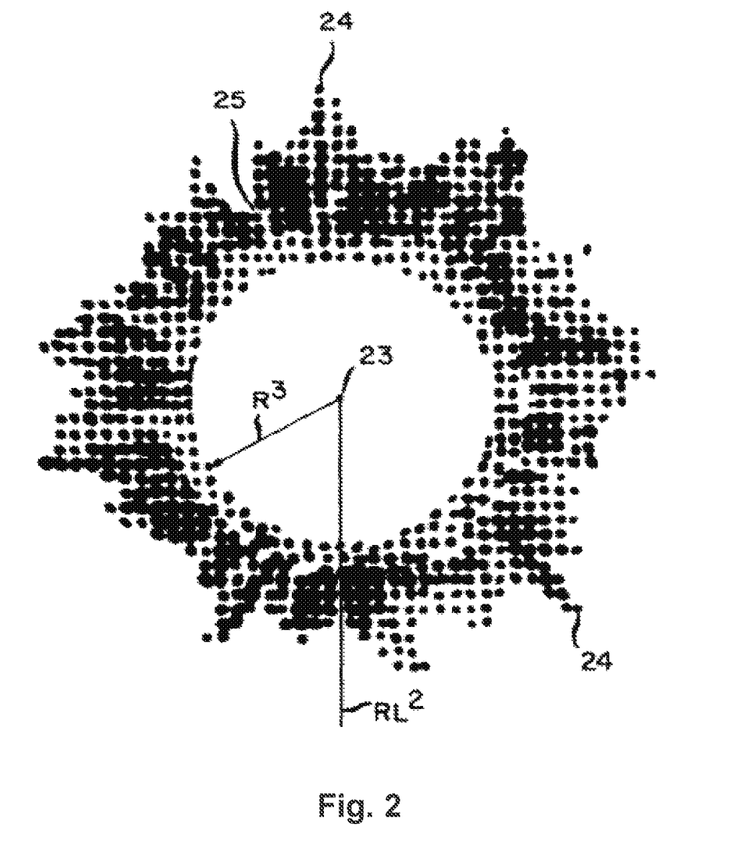
FIG. 2 as an example illustrates a "cosmetic pattern" in accordance with the present invention.

The lens cosmetic pattern of FIG. 2 has an inner radius $R^3$ of about 2 mm and a variable outer radius having a maximum of about 4.5 mm at 24 and a minimum of about 2.7 mm at 25. Variations in the outer radius create the jagged outer edge of the FIG. 2 pattern. Notice that since the FIG. 1 pattern has a has radius $R^1$ of 5.2 mm, the outer pattern extends inward, into the iris section distances of about 5.2-4.5 or 0.7 mm (minimum) to about 5.2-2.7 or 2.5 mm (maximum).

The radial width of the iris section is outer radius $R^1$ minus inner radius $R^3$ or 5.2 mm−2 mm=3.2 mm. Hence, it can be seen that the distance of the jagged border from the outer perimeter of the iris section ranges from a minimum of 0.7/3.2 or about 20% of the radial width of the iris section to a maximum of 2.5/3.2 or about 80% of the radial width of the iris section. In general, the minimum distance of the jagged border from the outer perimeter of the iris section should be from about 5% to about 45% (more preferably about 10% to about 30%) of the radial width of the iris section and the maximum distance of the jagged border from the outer perimeter should be from about 45% to about 95% (more preferably about 60% to about 80%) of the radial width. Hence, the outer pattern comprises a substantial portion of the area of the iris and is not merely a thin outer ring at the periphery as described, for example, in U.S. Pat. No. 4,719,657, (Bawa) col. 7, line 56 to Col. 8, line 34.

Figure 3:
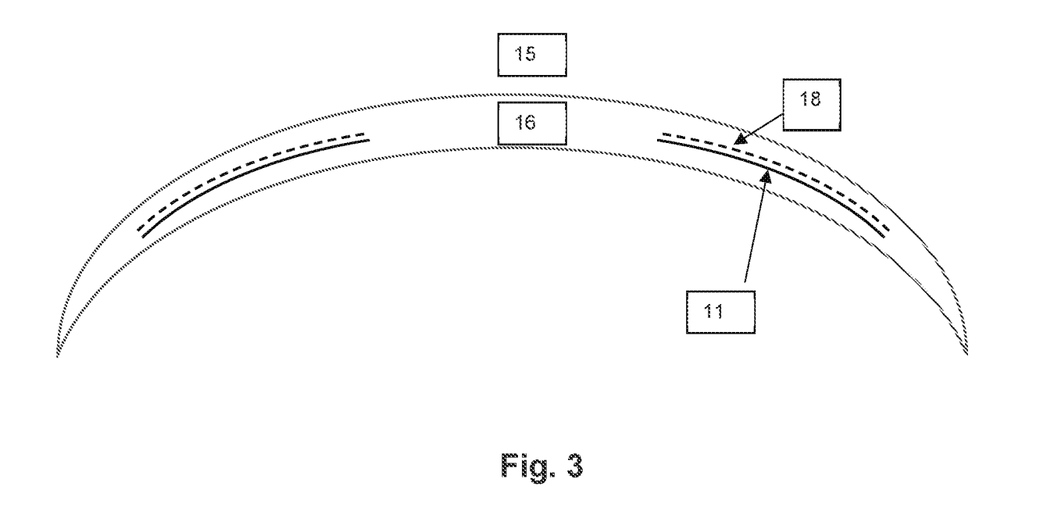
FIG. 3 as an example illustrates a finished cosmetic contact lens containing the cosmetic film.

FIG. 3 is a sectional view of a finished cosmetic contact lens (15), including a cosmetic film (11) in the body of the lens (15), after polymerization of pre-polymer and conventional lens forming material (16). The cosmetic film has a donut shape with an empty circle in the center corresponding to non-opaque pupil section when the contact lens is on-eye and centered The cosmetic film layer 11 can be numerous variations of polymeric film, either thermal plastic or thermosetting plastic and either mono layer or multilayer films.

Thermoplastic materials such as acrylic, PVP, PLA, PGA, or copolymers thereof, could be used. PVP might be a good starting candidate, since this material has a chance of good material compatibility (i.e. good chain interpenetration) with the lens formulation. Alternately, the thermoplastic could be composed of solid silicone material, which could be cured into the contact lens formulation.

Alternately, the cosmetic film could be thermoplastic initially, which becomes crosslinked after heat treatment during thermoforming, or reacted with the contact lens formulation. For example, other thermal plastics such as polyester, polyethylene or polypropylene can be used as a film material because it provides flexibility. Such a film may be corona treated as appropriate for specific applications. Polyester can also be used because it provides improved strength permitting use of thinner gauge film and is not stretchable when used on a multilayer printing press.

Alternately, the cosmetic film could be thermoset, where the cosmetic film is a thermosetting polymer or resin. In contrast to thermoplastics, thermosets (alternately known as thermosetting plastics or thermosetting polymers) are materials which remain in a permanent solid state after being cured one time. Common examples of thermoset plastics and polymers include epoxy, silicone, polyurethane and phenolic. Essentially, after printing, the thermoset film is compression molded into the hemispherical shape. In contrast to thermoplastics, thermosets (alternately known as thermosetting plastics or thermosetting polymers) are materials which remain in a permanent solid state after being cured one time. Common examples of thermoset plastics and polymers include epoxy, silicone, polyurethane and phenolic.

After thermoforming/thermosetting, the cosmetic film can be mechanically cut or shaped to form a lens or a toroid shape, removing any edge defect or flash. The modified cosmetic film can be inserted into the DSM mold, and the contact lens formulation shaped around it. The thermoforming/thermosetting step can also be used to apply a small lip on the insert, which would allow for proper placement within the DSM mold (i.e. the insert would be put between the lens formulation). Porosity is adding processibility to insert the cosmetic film during contact lens manufacturing. The thin film with printed cosmetic patterns with good porosity can achieve a good adhesion between the cosmetic film to the lens forming material to avoid the delamination between cosmetic film and lens body. In addition, porosity may be a suitable means for improving water and oxygen permeability of the cosmetic hydrogel contact lens. But permeability of standard film is probably too slow to permit exclusive use of this means for passage of liquid between cosmetic film and the lens forming material. Films may be perforated.

A physical means for passage of liquid between the cosmetic film and the lens forming material includes an aperture in the film or any such opening in the film that permit liquid to exchange between two sides of the insert. A means for passage of liquid includes any aperture, breach, break, burrow, cavity, crack, cranny, entrance, gap, hole, orifice, opening, perforation, puncture, rip, shaft, slit, slot, space, tear, tunnel, void or equivalent thereof known or yet to be known.

According to the present application, cosmetic film is a film is printed with a cosmetic pattern or a tinted film. Multiple cosmetic films (inserts) can be printed on a large sheet, possibly using alternate printing techniques to pad printing (i.e. dye sublimation, rotary presses, offset presses, gravure, flexography). In addition, the sheets of printed cosmetic films can be washed in a solvent (aqueous or organic) prior to thermoforming to eliminate any residual monomers that would impact the final lens toxicity. In any regard, the multiple cosmetic films (inserts) can be punched directly into the mold immediately before dosing and curing.

Gravure printing can be used to print the cosmetic pattern to the flexible film because it allows for metering the thickness of the application of inks. Ink can be repeatedly applied to the desired thickness with the most constant and exact application. Another method of applying ink is flexographic printing. Other methods are known to one of ordinary skill in the art that include rotary screen printing and letter press. The printing method is a function of the amount of ink required for the specific application.

FIG. 3 is a sectional view of a finished cosmetic contact lens (15), including a cosmetic film (11) with the cured print area (18) in the body of the lens (15), after polymerization of pre-polymer and conventional lens forming material (16). Contact lens 15 is a cosmetic contact lens useful for enhancing or changing the apparent color of the wearer's iris. When the lens is designed for enhancing the color of the wearer's iris, the colored pattern is translucent; for example, a blue colored cosmetic film containing contact lens can make the iris of a light-eyed wearer appear bluer. In this case, cosmetic film can be a blue tinted film. When the iris is designed for changing the apparent color of the wearer's iris, the colored pattern is opaque so that it masks the natural color of the iris, for example, a blue colored lens can make the iris appear blue, even a dark-eyed wearer. In this case, the cosmetic pattern containing opaque pigments can be printed onto the clear color film.

The lens may include an optical correction, for example, a correction to accommodate farsightedness or nearsightedness, or the lens may lack an optical correction and be worn solely for cosmetic purposes.

A "lens formulation" refers to a polymerizable composition which can be can be (cured (i.e., polymerized and/or crosslinked) thermally or actinically (i.e., by actinic radiation) to obtain a crosslinked polymer. Examples of actinic radiation are UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art such as: non-silicone hydrogel and silicone hydrogel. According to the present application, both non-silicone hydrogel and silicone hydrogel can be used to produce the contact lend containing cosmetic film.

Traditional soft hydrogel contact lenses made from non-silicone hydrogel such as HEMA polymers utilize plastics that contain variable amounts of water. These lenses rely on the amount of water in the polymer to regulate how much oxygen can pass through the lens; the oxygen transmissibility levels (Dk/t) and the amount of oxygen transmitted to the cornea can be manipulated by increasing the water content.

For production of silicone hydrogel (SiHy) contact lenses, a SiHy lens formulation for cast-molding of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant SiHy contact lenses then can be subjected to extraction with an extraction solvent to remove unpolymerized components from the resultant lenses and to hydration process, as known by a person skilled in the art. Numerous silicone hydrogel lens formulations have been described in numerous patents and patent applications published by the filing date of this application. All of them can be used in obtaining a SiHy contact lens of the invention. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, can also be used in making SiHy contact lenses.

The ink formulation, applied to the flexible film surface, includes a colorant, such as a pigment having the form of solid particles or a dye, and a monomeric material. The terms "monomer" or "monomeric" denote materials that are polymerizable by free radical polymerization, such as compounds containing ethylenic unsaturation and including higher molecular weight monomeric materials often referred to macromonomers. The monomeric material of the ink mixtures may include the aforementioned hydrophilic and/or crosslinking monomers commonly employed as lens-forming monomers; the ink monomeric material may be the same as a lens-forming monomer, or different monomers may be employed in the ink mixture and the lens-forming copolymer. The ink mixtures may optionally further comprise a solvent, a polymerization initiator, or a binding agent. The solvent may be employed in the ink mixture in order to obtain an ink mixture with a desired viscosity, or to assist with mixing of the colorant and monomeric material. The polymerization initiator may be included to facilitate polymerization of the monomeric material. The binding agent may be employed to facilitate binding of the colorant to the monomeric material. After applying the monomeric ink mixture to flexible film surface, the ink monomeric mixture is cured, for example, by thermal and/or light polymerization, typically accomplished by exposing the monomeric material to heat and/or light radiation such as UV light.

Figure 4:
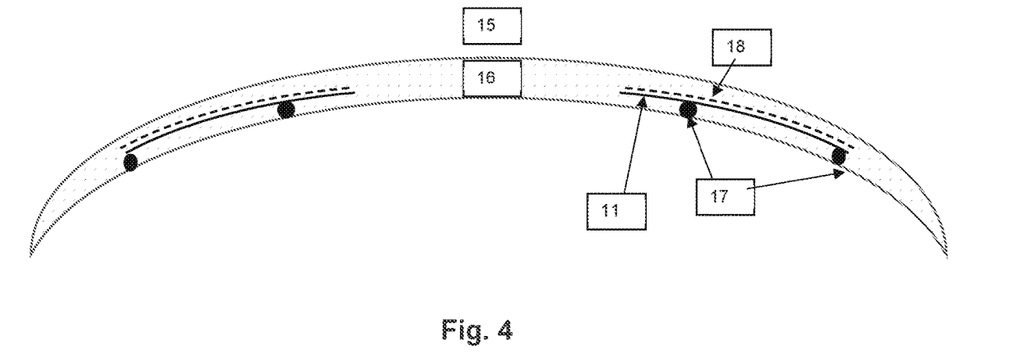
FIG. 4 as an example illustrates a finished cosmetic contact lens containing the cosmetic film with supporting struts (17).

Existing converting equipment (besides printing, coating, and laminating) allows other operations to be performed in-line, such as folding, die cutting, and embossing. For example, a cosmetic patter can be printed on a flexible film across the web, then cut to achieve the desired properties such a donut shape having proper round size with empty circle area for corresponding to pupil area when wearing on the wearer's eye. Another example, flexible film can be embossed to raise the cosmetic pattern to create a 3D graphic. This raised design is achieved by pushing a metal die into the flexible film from underneath. The cosmetic hydrogel contact lens containing the embossed cosmetic film looks more 3D and natural than the un-embossed cosmetic film. Another possible advantage of using thermoformable insert is that structural elements can be molded into the insert using a embossing or debossing technique. For example (see FIG. 4), structural posts can be made by pressing a 50-100 micron divot into the thermoformable insert. This 50-100 micron structural post can be used to keep the insert and print off of the base curve (posterior side, in this case) during the bulk polymer casting process. A similar structural post can be made on the front curve side (anterior side) by pressing a divot towards that direction. Single or multiple structural elements can be made into this insert.

The present invention, in another aspect, provides a method for producing colored hydrogel contact lenses each having at least one cosmetic colored film embedded therein, comprising the steps of:
(1) obtaining a polymerizable composition for forming a hydrogel material,
(2) obtaining a lens mold, wherein the lens mold comprises a male mold half having a first molding surface and a female mold half having a second molding surface, wherein the male and female mold halves are configured to receive each other such that a mold cavity is formed between the first and second molding surfaces when the mold is closed;
(3) obtaining a cosmetic colored film, wherein the cosmetic colored film is made of a thermal plastic material or thermal setting material;
(4) placing the cosmetic colored film at a specified position in the lens mold and introducing the polymerizable composition in the lens mold, wherein the cosmetic colored film is immersed in the polymerizable composition in the lens mold;
(5) curing the polymerizable composition in the lens mold to form a cosmetic hydrogel contact lens having the cosmetic colored film surrounded by the hydrogel material;
(6) separating the lens mold obtained in step (5) into the male and female mold halves, with the cosmetic hydrogel contact lens adhered on a lens-adhered mold half which is one of the male and female mold halves;
(7) removing the cosmetic hydrogel contact lens from the lens-adhered mold half; and
(8) subjecting the cosmetic hydrogel contact lens to post-molding processes including a hydration process and one or more other processes selected from the group consisting of extraction, surface treatment, packaging, sterilization, and combinations thereof.

Contact lenses of the invention can be manufactured according to a modified cast-molding process involving disposable molds (e.g., PCT published patent application No. WO/87/04390, EP-A 0 367 513, U.S. Pat. No. 5,894, 002) or by the so-called Lightstream Technology™ (Alcon) which involving reusable molds and curing a lens-forming composition under a spatial limitation of actinic radiation (U.S. Pat. Nos. 5,508,317, 5,583,163, 5,789,464, 5,849,810, and 8,163,206) from a lens formulation for forming a non-silicone hydrogel but preferably a silicone hydrogel.

According to the present application, both non-silicone hydrogel and silicone hydrogel can be used to produce the contact lend containing cosmetic film.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc.

In accordance with the invention, a contact lens can be produced as follows.

First, a mold comprising one female mold half and male mold half is obtained, wherein the female mold half defines a first molding (or optical) surface which corresponds to the anterior surface of a contact lens and the second mold half defines a second molding (or optical) surface which corresponds to the posterior surface of the contact lens, wherein the female and male mold halves are configured to receive each other such that a lens forming cavity is formed between the first molding surface and the second molding surface. The molding surface of a mold half is the cavity-forming surface of the mold and in direct contact with lens formulation. Second, a first amount of a lens formulation (or preferably a silicone hydrogel lens formulation) is deposed onto the first molding surface of the female mold half to form a first layer with a desired thickness (e.g., a thickness of from about 5 micrometers to about 50 micrometers, preferably from about 5 micrometers to about 40 micrometers, more preferably from about 10 micrometers to about 30 micrometers) according to any method known to a person skilled in the art. After the formation of the first layer of the lens formulation on the first molding surface of the female mold half, the first layer of the lens formulation can be cured partially or substantially (optional step). Third, at least one cosmetic film is placed on top of the first layer of the lens formulation which is optionally cured. Fourth, a second amount of the lens formulation is deposed all over the first layer, Fifth, the male mold half is closed with the female mold half. Sixth, the closed mold with the first and second layers of lens formulation and the cosmetic film sandwiched between the first and second layers of the lens formulation within the mold cavity formed between the first and second molding surfaces is subjected to curing conditions (thermal curing or actinic curing conditions) to form a contact lens of the invention. It is understood that a result contact lens of the invention can be subjected to other processes, lens extraction, hydration, coating, and packaging, autoclave, and combinations thereof, as known to a person skilled in the art.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

What is claimed is:

1. A colored hydrogel contact lens, comprising:
a hydrogel material; at least one cosmetic colored film;
wherein the cosmetic colored film is made of a thermal plastic material and is surrounded by the hydrogel material, wherein the thermal plastic material is selected from the group consisting of acrylic, PLA, PGA, copolymers thereof, polyester, polyethylene and polypropylene, wherein the cosmetic film is embossed to raise a cosmetic pattern to create a 3D graphic, wherein the cosmetic film is flexible and has a thickness at least 5 micron and less than 80 micron,
wherein the colored hydrogel contact lens is capable of absorbing from about 10% to about 75% by weight of water when being fully hydrated,
wherein the contact lens has an anterior surface and an opposite posterior surface and a circumferential edge where the anterior and posterior surfaces are tapered off,
wherein the contact lens comprises a central optical zone, a peripheral zone surrounding the central optical zone, and an edge zone surrounding the peripheral zone.

2. The contact lens of claim 1, wherein a lens body is composed of a silicone hydrogel material.

3. The contact lens of claim 1, wherein a lens body is composed of a non-silicone hydrogel material.

4. The contact lens of claim 1, wherein the cosmetic film is porous to achieve a good adhesion between the cosmetic film to a lens forming material for avoiding the delamination.

5. The contact lens of claim 1, wherein the cosmetic film has a donut shape with an empty circle in a center corresponding to non-opaque pupil section when the contact lens is on-eye and centered.

6. The contact lens of claim 1, wherein the cosmetic film is a tinted film made from a reactive dye with thermal plastic material or thermal setting material.

7. The contact lens of claim 1, wherein the cosmetic film is printed with a cosmetic pattern.

8. The contact lens of claim 1, wherein the cosmetic film has a shape of a donut which is concentric with a center of the contact lens and has a substantially even exterior peripheral edge having a diameter of from about 8 mm to about 14 mm.

9. The contact lens of claim 1, wherein the cosmetic film has an opaque colored pattern and partially or completely over a lens iris's area when the contact lens is on-eye and centered, provided that an innermost border or edge, closest to the geometric center of the lens, of the flat annular ring is about 5 mm to about 12 mm from the geometric center of the contact lens.

* * * * *